United States Patent
Berardi et al.

(10) Patent No.: US 8,293,857 B2
(45) Date of Patent: Oct. 23, 2012

(54) PROCESS FOR POLYMERISING ETHYLENE

(75) Inventors: Alain Berardi, Marseilles (FR); Andre Frederich, Brussels (BE); Dominique Jan, Beaufays (BE); Jean-Jacques Kuhlburger, Martigues (FR); Anthony Sgard, Marignane (FR); Alain Van Daele, Geer (BE)

(73) Assignee: Ineos Europe Limited, Hampshire (GB)

( * ) Notice: Subject to any disclaimer, the term of this patent is extended or adjusted under 35 U.S.C. 154(b) by 7 days.

(21) Appl. No.: 12/734,585

(22) PCT Filed: Oct. 15, 2008

(86) PCT No.: PCT/EP2008/063875
§ 371 (c)(1), (2), (4) Date: May 11, 2010

(87) PCT Pub. No.: WO2009/065677
PCT Pub. Date: May 28, 2009

(65) Prior Publication Data
US 2010/0234543 A1    Sep. 16, 2010

(30) Foreign Application Priority Data

Nov. 22, 2007 (EP) .................................... 07121311

(51) Int. Cl.
*C08F 2/00* (2006.01)
*C08F 4/44* (2006.01)
*C08F 4/52* (2006.01)
*C08F 4/12* (2006.01)
*C08F 110/02* (2006.01)
*C08F 4/02* (2006.01)

(52) U.S. Cl. .... 526/153; 526/86; 526/124.1; 526/124.2; 526/226; 526/352; 526/185; 502/132

(58) Field of Classification Search .................. 526/352, 526/185, 86, 163
See application file for complete search history.

(56) References Cited

U.S. PATENT DOCUMENTS 3,995,098 A * 11/1976 Avaro et al. ................... 526/151
4,260,708 A    4/1981 Fodor
(Continued)

FOREIGN PATENT DOCUMENTS
EP    57352 A2 *   8/1982
(Continued)

OTHER PUBLICATIONS

English translation of JP 2002206008 A.*
(Continued)

*Primary Examiner* — David W Wu
*Assistant Examiner* — Elizabeth Eng
(74) *Attorney, Agent, or Firm* — Nixon & Vanderhye

(57) ABSTRACT

Process for polymerization of ethylene using a catalyst system including (i) a solid catalyst of Ti, Mg and halogen, (ii) a first activator which is at least one trialkylaluminium compound of the formula $AlR_3$, where each R is independently a C2 to C20 alkyl radical, and (iii) a second activator which is at least one alkylaluminium chloride of the formula $AlR'_2Cl$, where each R' is independently a C2 to C20 alkyl radical. The second activator is introduced directly into the polymerization reactor, without precontact with the solid catalyst, continuously or semi-continuously, and at a maximum rate of introduction at any time corresponding to less than 10 ppm by weight of chlorine relative to the rate of polyethylene production.

10 Claims, 2 Drawing Sheets

U.S. PATENT DOCUMENTS

| | | | |
|---|---|---|---|
| 4,342,855 | A | 8/1982 | Akimoto et al. |
| 4,387,202 | A * | 6/1983 | Falbe et al. ............ 526/138 |
| 5,139,986 | A | 8/1992 | Cook et al. |
| 5,322,830 | A * | 6/1994 | Sormunen et al. .......... 502/9 |
| 5,491,208 | A | 2/1996 | Tanaglia et al. |
| 6,184,299 | B1 | 2/2001 | Madden et al. |
| 6,232,255 | B1 | 5/2001 | Winslow et al. |
| 6,576,710 | B1 | 6/2003 | Huovinen et al. |
| 6,617,405 | B1 | 9/2003 | Jorgensen |
| 6,716,940 | B1 | 4/2004 | Dall'Occo et al. |
| 7,157,532 | B2 * | 1/2007 | Payer et al. ............ 526/118 |

FOREIGN PATENT DOCUMENTS

| | | | |
|---|---|---|---|
| EP | 0 425 701 | A1 | 5/1991 |
| EP | 0 435 557 | A2 | 7/1991 |
| EP | 0 528 558 | A1 | 2/1993 |
| EP | 0 703 246 | B1 | 1/2002 |
| GB | 1 355 245 | | 6/1974 |
| GB | 2 016 023 | A | 9/1979 |
| JP | 57131206 | A * | 8/1982 |
| JP | 58127710 | | 7/1983 |
| JP | 10195135 | | 7/1998 |
| JP | 2002206008 | A * | 7/2002 |
| SU | 1396331 | | 10/1986 |
| WO | WO 95/17434 | A1 | 6/1995 |
| WO | WO 96/04320 | A1 | 2/1996 |
| WO | WO 00/24789 | A1 | 5/2000 |
| WO | WO 00/47639 | A2 | 8/2000 |
| WO | WO 00/52066 | A1 | 9/2000 |
| WO | WO 00/58374 | A1 | 10/2000 |
| WO | WO 00/75202 | A1 | 12/2000 |
| WO | WO 00/75203 | A1 | 12/2000 |
| WO | WO 01/19879 | A1 | 3/2001 |
| WO | WO 2004/050722 | | 6/2004 |

OTHER PUBLICATIONS

International Preliminary Report on Patentability; Form PCT/IPEA/416, mailed Mar. 19, 2010; International Application No. PCT/EP2008/063875; International Filing Date Oct. 15, 2008 (9 pgs).

* cited by examiner

PROCESS FOR POLYMERISING ETHYLENE

This application is the U.S. national phase of International Application No. PCT/EP2008/063875 filed 15 Oct. 2008 which designated the U.S. and claims priority to European Patent Application No. 07121311.0 filed 22 Nov. 2007, the entire contents of each of which are hereby incorporated by reference.

The present invention relates to a process for polymerisation of ethylene, in particular using a catalyst system comprising a solid catalyst comprising Ti, Mg and halogen and at least two activators.

BACKGROUND OF THE INVENTION

Processes for the production of polyethylenes using catalysts based on Ti, Mg and halogen are well known in the art. It is also known that such processes are advantageously operated in the presence of alkylaluminium-based activators. Single activators, or combinations of activators may be used. WO 95/17434, for example, describes a catalyst system which uses both a trialkylaluminium (TAA) and dimethylaluminium chloride (DMAC), the DMAC and TAA being present in molar ratios from 30 to 300. WO 01/19879 describes a similar catalyst system, in terms of the components, but at lower DMAC/TAA molar ratio, in particular, in the range between 0.3 and 5.

In general, the use of chlorine-containing activators has a number of potential drawbacks. Perhaps the biggest drawback is the potential to form acids, which can cause significant corrosivity in the presence of moisture, either in the reactor, the flake conveyors, the purge columns or other parts of the downstream process in general, or possibly the resulting polymer.

Some general background can be found in U.S. Pat. No. 4,567,155 which seeks to provide a catalyst system with no active chloride. Further attempts to address the problems of chlorides have included the "passivation" of reactors, such as described in EP 0718322 B1, and the deactivation of halide-containing olefin oligomerisation catalyst systems under conditions which inhibit or limit the decomposition of the catalyst systems, such as described in WO 2004/082827.

SUMMARY OF THE INVENTION

It has now been found that an improved polymerisation process can be obtained by selection of a co-catalyst combination of a trialkylaluminium and an alkylaluminium chloride heavier than dimethylaluminium chloride under specific conditions.

In particular, and in a first embodiment, the present invention provides a continuous process for polymerisation of ethylene in a polymerisation reactor, which process comprises using a catalyst system comprising:
i) a solid catalyst comprising Ti, Mg and halogen,
ii) a first activator which is at least one trialkylaluminium compound of the formula $AlR_3$, where each R is independently a C2 to C20 alkyl radical, and
iii) a second activator which is at least one alkylaluminium chloride of the formula $AlR'_2Cl$, where each R' is independently a C2 to C20 alkyl radical,
characterised in that the second activator is introduced directly into the polymerisation reactor, without precontact with the solid catalyst, continuously or semi-continuously, and at a maximum rate of introduction at any time corresponding to less than 10 ppm by weight of chlorine relative to the rate of polyethylene production.

The process of the present invention uses a co-catalyst combination of at least one trialkyl aluminium (TAA) and at least one alkylaluminium chloride (AAC) having C2 to C20 groups, but where the at least one alkylaluminium chloride is introduced directly into the reactor. It has been found that the present invention provides an improved process despite the relatively low amount of alkylaluminium chloride used.

In particular, the introduction of alkylaluminium chloride at relatively low levels directly in the reactor allows the second activator to be well dispersed in the reaction zone and to be used to "fine tune" the overall catalyst activity. Thus, for a particular catalyst, the level of the first activator may be relatively fixed, for example it may already be present as part of a pre-prepared catalyst form, especially as a prepolymer, and the level of the second activator can be adjusted in the reactor as required to maintain overall activity.

In addition, it has been found that use of alkylaluminium chlorides according to the present invention, rather than no activator or the use of trialkylaluminium activators in the reactor, can result in significant improvements in the subsequent polymer morphology.

The use of alkylaluminium chlorides having C2 to C20 groups rather than methyl groups is also important in the present invention. Particularly, alkylaluminium chlorides having C2 to C20 groups, rather than methyl groups, have the advantage of being less volatile than DMAC, which means that they are less likely to spread outside of the reaction zone at the temperatures of polymerisation, reducing potential corrosivity issues due to the chlorides. The dosing of DEAC and higher alkylaluminium chlorides to obtain the required activity enhancement is also correspondingly easier to control.

Thus, the alkylaluminium chlorides according to the present invention have been found to provide a positive impact on catalyst productivity whilst avoiding agglomerates and "strings" in the reactor. Agglomerates and "strings" are filaments of polymer which can form if activity is not well-controlled (which can be a particular issue with DMAC) and which can result in loss of production. Such agglomerates and "strings" tend to have high quantities of catalyst residues and, without wishing to be bound by theory, are believed to result from initial high activity and poor dissipation of the heat of reaction.

Because of the potential corrosivity of alkylaluminium chlorides, it is desired to keep the level in the reactor small. In particular, and although in theory small amounts of a further alkylaluminium chloride could be added to the catalyst prior to the reactor, in the present invention preferably no alkylaluminium chloride is introduced other than directly into the polymerisation reactor.

The solid catalyst comprising Ti, Mg and halogen may be any suitable solid catalyst. Such catalysts are generally termed "Ziegler Natta" catalysts. The catalyst may be supported, silica being a preferred support in this case, but is preferably unsupported.

The catalyst may be a catalyst containing essentially atoms of titanium, halogen and magnesium and optionally a refractory oxide e.g. silica or alumina. It may be prepared by a method comprising a reaction between magnesium metal, at least one halogenated hydrocarbon and at least one tetravalent titanium compound. Such a method is described, for example, in French Patents No. 2,099,311 and No. 2,116,698.

The catalyst may comprise a granular support based especially on a refractory oxide such as, for example, silica and/or alumina. Such a catalyst can be prepared by a method comprising bringing the granular support into contact with (a) a dialkylmagnesium and optionally a trialkylaluminium, (b) a halogenated hydrocarbon e.g. a monohalogenated hydrocarbon, (c) and a tetravalent titanium compound. Such a method is described in European Patent Application EP-A-453,088.

The catalyst may also contain a magnesium chloride support and in particular a preactivated support such as that described in European Patent Application EP-A-336,545. A catalyst of this type can be prepared by a method comprising bringing a magnesium chloride support into contact with (a) an organometallic compound which is a reducing agent for titanium, (b) a tetravalent titanium compound and c) optionally one or more electron-donor compounds. Such a method is described in French Patent Application FR-A-2,669,640.

The catalyst may be used in the form of a solid as it is or in the form of a prepolymer, especially when it is used in a gas phase polymerisation. The prepolymer is obtained by bringing the catalyst into contact with one or more of olefins e.g. containing from 2 to 8 carbon atoms such as, for example, ethylene or a mixture of ethylene with C3-C8 olefin(s) in the presence of an organometallic cocatalyst. In general, the prepolymer obtained contains from 0.1 to 200 g preferably from 10 to 100 g of polymer per millimole of titanium.

The first activator is at least one trialkylaluminium compound of the formula $AlR_3$, where each R is independently a C2 to C20 alkyl radical. Thus, the first activator may be a single compound of formula AlR3 or a combination of two or more compounds of formula AlR3. Preferably, at least because of the simplicity of manufacture and hence cost, all the R groups are the same. Preferred trialkylaluminiums with all three R groups being the same are those having C2 to C10 alkyls, such as triethylaluminium (TEA), tripropylaluminium (TBA), tri(isobutyl) aluminium (TiBA), tri(n-butyl) aluminium (TnBA), tri(n-hexyl)aluminium (TnHA) and tri(n-octyl)aluminium (TnOA). Especially when the catalyst is used in the form of a pre-polymer, tri(n-hexyl)aluminium (TnHA) and tri(n-octyl)aluminium (TnOA) are particularly preferred.

Although the addition of the second activator directly into the reactor is critical to the process of the present invention, the addition of the first activator is less critical. Thus the first activator may be added directly to the reactor or may be pre-contacted with the solid catalyst prior to the reactor, or a combination of both may be used. Although the first activator may be added directly to the reactor, when this is the case the second activator is preferably introduced separately to the first activator. One particularly preferred method of introducing the first activator (and the solid catalyst) is to contact the first activator with the solid catalyst and ethylene to form a prepolymer, which is subsequently introduced into the reactor. The pre-polymer may be formed, for example, by polymerising ethylene in the slurry phase in the presence of the solid catalyst, hydrogen and the first activator, and subsequently drying the formed pre-polymer. The pre-polymer typically comprises polyethylene in an amount of 10 to 100 g polyethylene/mmole Ti, preferably of 25-40 grams polyethylene/mmole Ti.

The molar ratio of the first activator to Ti in the catalyst system may vary over wide limits known to the person skilled in the art, and which depend on the exact catalyst to be used and the method of introduction. When the first activator is used in the form of a prepolymer, for example, the preferred molar ratio of first activator to Ti is less than 3 mole/mole, preferably less than 2 mole/mole, for example in the range 1 to 2 mole/mole.

The second activator is at least one alkylaluminium chloride of the formula $AlR'_2Cl$, where each R' is independently a C2 to C20 alkyl radical. Thus, the second activator may be a single compound of formula $AlR'_2Cl$ or a combination of two or more compounds of formula $AlR'_2Cl$. Preferably, at least because of the simplicity of manufacture and hence cost, both the R' groups are the same. Preferred alkylaluminium chlorides with both R' groups being the same are those having C2 to C10 alkyls, and more preferably, having C2 to C5 alkyls, such as diethylaluminium chloride (DEAC), dipropylaluminium chloride (DnPrAC), di(isobutyl)aluminium chloride (DiBAC) and di(n-butyl)aluminium chloride (DnBAC). DEAC is most preferred as the second activator.

The addition of the second activator directly into the reactor without pre-contact with the solid catalyst is critical to the process of the present invention. Suitably one or more separate injection nozzles are provided for introduction of the second activator.

For avoidance of doubt, the polymerisation reactor into which the second activator is introduced in the process of the present invention may be the only reactor present in an overall polymerisation process, or may be one of a series of reactors. As one example the reactor into which the second activator is introduced in the process of the present invention may be the second reactor where a prepolymerisation reactor is also present as the first reactor. The reactor into which the second activator is introduced in the process of the present invention may also be one of a multistage gas-phase processes using two or more gas phase reactors as described, for example in U.S. Pat. Nos. 4,703,094, 5,665,818 and 6,184,299. As a further example, the process of the present invention may take place in the gas phase reactor of a two (or more) reactor system comprising a slurry reactor followed by a gas-phase reactor, as described in WO 2004/039847.

When a series of reactors are present, the reactor into which the second activator may be introduced may be any of the reactors in the series, as long as the second activator is introduced without precontact with the solid catalyst prior to the reactor.

It is also critical that during the polyethylene production the second activator is introduced continuously or semi-continuously at a maximum rate of introduction at any time corresponding to less than 10 ppm of chlorine relative to the rate of polyethylene production. For example, for a process producing polyethylene at a rate of 10,000 kg/hr, the maximum rate of introduction of the second activator at any time cannot exceed a rate equivalent to 0.1 kg/hr of chlorine.

By "semi-continuously" is meant that the second activator is introduced for a period of time (but still at a rate of less than 10 ppm of chlorine relative to the rate of polyethylene production) but its introduction may then be stopped for a period of time before the introduction is restarted again. This may be repeated as required. The time periods during which the second activator is introduced and the time periods during which no second activator is introduced may be constant or may be varied. The second activator is usually being introduced for at least 50% of the time for which the process is producing polyethylene, preferably at least 90% of the time.

Most preferably the second activator is introduced continuously during polyethylene production.

The rate of introduction of the second activator may also be considered as the instantaneous rate. According to the process of the present invention, addition of the second activator in amounts above 10 ppm of chlorine relative to the rate of polyethylene production, for example as relatively large aliquots as a single injection or otherwise in a short period of time, is excluded even if this might result in an average of less than 10 ppm of chlorine relative to the rate of polyethylene production over a longer time period. This ensures that the corrosion risk associated with the use of alkylaluminium chlorides is maintained at an acceptable level. In particular, at such levels the main source of acidic chloride which may cause corrosion is still provided by the catalyst.

Preferably, the second activator is introduced at a maximum rate at any time corresponding to less than 5 ppm of chlorine relative to polyethylene produced, more preferably corresponding to less than 3 ppm, and most preferably less than 2 ppm.

Preferably the second activator is provided at a ratio relative to the first activator of less than 0.5 mole/mole, and more preferably of less than 0.2 mole/mole, such as in the range 0.05 to 0.15 mole/mole.

Even when the introduction of the second activator is performed continuously, the rate of introduction of the second activator may be varied with time, subject to remaining below the maximum introduction rate at any particular time. However, it is generally preferred to have an essentially constant rate of introduction of the second activator corresponding to the desired rate of introduction relative to the rate of polyethylene production.

Surprisingly, even at such low rates, which are significantly lower than the rates for DMAC described in WO 95/17434, and WO 01/19879, the introduction of the second activator provides significantly improved catalyst activity in the reactor, whilst providing stable operation, higher activity and higher H2 response (less H2 is required for the same MI product). The restriction on the flow rate of the alkylaluminium chloride ensures that the polyethylene produced contains only small amounts of chlorine (less than or equal to 10 ppm being typical from the process of the present invention), and that there are therefore no major differences in the properties of the polyethylene due to the presence of the chloride. Particularly, the yellowness of the polyolefin products usually associated to the use of alkylaluminium chlorides is not observed here In fact, the only difference that has been noted is an improvement in Whiteness Index during blow-moulding compared to processes using non-chlorinated activators.

Thus, in a second aspect, the present invention provides a method for improving the whiteness index of a polyethylene obtained by the continuous polymerisation of ethylene in a polymerisation reactor, which polymerisation process comprises using a catalyst system comprising:
  i) a solid catalyst comprising Ti, Mg and halogen, and
  ii) a first activator which is at least one trialkylaluminium compound of the formula AlR3, where each R is independently a C2 to C20 alkyl radical,
  and characterised in that a second activator which is at least one alkylaluminium chloride of the formula AlR'2Cl, where each R' is independently a C2 to C20 alkyl radical is introduced directly in the polymerisation reactor, without precontact with the solid catalyst, continuously or semi-continuously, and at a maximum rate of introduction at any time corresponding to less than 10 ppm by weight of chlorine relative to the rate of polyethylene production.

The polymerisation process of the present invention is preferably a gas phase polymerisation process.

By "continuous" in relation to the polymerisation of ethylene, as used herein, is meant that polyethylene product is removed from the reactor during the polymerisation process whilst ethylene is continuously fed to the reactor to replace ethylene removed as polyethylene product. Such a process can be contrasted with so-called "batch" reactions in which polymer product is only removed from the reactor at the end of the reaction. Although the polymerisation process is referred to as continuous, the removal of the polyethylene product from the reactor may be either continuous or semi-continuous.

The polymerisation is preferably carried out in a vertical fluidised bed reactor according to techniques known in themselves and in equipment such as that described in European patent application EP-0 802 202, EP-0 855 411, EP-1 644 423, French Patent No. 2,207, 145 or French Patent No. 2, 335, 526. The process of the invention is particularly well suited to industrial-scale reactors of very large size.

In the gas phase fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer, which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

Fresh catalyst, co-catalysts and monomers are added to the process as required, usually in a continuous or semi-continuous manner, to maintain the production rate.

The process according to the present invention is particularly suitable for the manufacture of copolymers of ethylene. Preferred alpha-olefins used in combination with ethylene in the process of the present invention are those having from 4 to 8 carbon atoms. The preferred alpha-olefins are but-1-ene, pent-1-ene, hex-1-ene, 4-methylpent-1-ene, oct-1-ene and butadiene, the most preferred comonomer being the hex-1-ene.

When liquid condenses out of the recycle gaseous stream, it can be a condensable monomer, e. g. but-1-ene, hex-1-ene, 4-methylpent-1-ene or act-1-ene used as a comonomer, and/or an optional inert condensable liquid, e. g. inert hydrocarbon(s), such as $C_4$-$C_8$ alkane(s) or cycloalkane(s), particularly butane, pentane or hexane.

The process is particularly suitable for polymerising olefins at an absolute pressure of between 0.5 and 6 MPa and at a temperature of between 55 and 135° C., preferably 80° C. and 120° C.

The invention will not be illustrated with respect to the following Examples and FIGS. 1 to 3, wherein:

FIGS. 1 to 3 show SEM pictures of the resulting polymers formed according to the process of the present invention and according to certain comparative examples.

EXAMPLES

In the following Examples the results from a series of experiments using different combinations of trialklylaluminium and dialkylaluminium chlorides and with different orders of addition are compared. All Examples use the same catalyst under directly comparable conditions.

Catalyst productivity is expressed as the weight (in kg) of polymer produced per millimole of titanium introduced in the reactor. $MI_{2.16}$ was measured using the procedures of ASTM D-1238 (condition A) at 190° C. using a load of 2.16 kg. Density was measured according to ASTM-D-792.

The presence of molten polymer, usually containing higher catalyst residues than the free-flowing polymer powder, is marked by an "agglomerate index": none (no agglomerate at all), low (a few agglomerate of small size), high (presence of a large fraction of molten polymer).

The powder morphology was examined by Scanning Electron Microscopy (SEM) using a Zeiss DSM 982. For that purpose, a sample of the powder was submitted to a metallisation step (Pt/Pd-5 nm thickness). Pictures have been recorded with an original magnification of 1500 times.

A. Catalyst Preparation

The catalyst is prepared according to the teaching of EP 0703246 B1. In particular, 4.6 m$^3$ of hexane, 5.5 kg of iodine, 3160 moles of magnesium, 29 moles of isobutanol, 60 moles of titanium tetra-n-propoxide and 60 moles of n-butyl chloride were introduced into a 10-m$^3$ reactor fitted with a mechanical stirring system rotating at 150 revolutions per minute. The reactor was then heated to a temperature of 85° C. until the reaction began and then to 80° C. At this temperature 400 moles of titanium tetrachloride, 340 moles of titanium tetra-n-propoxide were introduced into the reactor, followed by 4700 moles of n-butyl chloride over 240 minutes. The mixture thus obtained was kept stirred at 80° C. for 2 hours. 48 moles of dimethylformamide were then added, and the reaction mixture was stirred for one additional hour at 80° C. The reactor was cooled down to 30° C., and the solid catalyst was washed three times with 3.9 m$^3$ of hexane. The catalyst was thus obtained as a suspension in hexane.

A fraction of the solid was collected from the suspension and dried. It comprised (% by weight): Ti:8; Cl:50; Mg:15.

B. Prepolymer Preparation 10 m$^3$ of hexane, 192 moles of tri-n-octylaluminium and a quantity of catalyst prepared previously containing 120 moles of titanium were introduced into a 23-m$^3$ reactor maintained under nitrogen atmosphere continuously stirred and heated to 70° C. Hydrogen and ethylene were then introduced for 6 hours and 40 minutes at a steady flow rate of 500 kg/h and 250 g/h, respectively. An increase in reactor pressure of about one bar is noticed during the prepolymerisation step. At the end of this time, the reactor was degassed and its content was transferred into a mechanically stirred evaporator in which hexane was removed by a circulation of nitrogen heated to 75° C. 3800 kg of a prepolymer containing 40 g of polyethylene per millimole of titanium were obtained.

Examples 1 to 9 (Comparative)

Examples 1 to 9 are performed in an autoclave with continuous introduction of ethylene to keep the ethylene partial pressure constant. Although performed in a batch reactor and with a relatively large initial injection of activator, and hence are all "comparative" for at least these reasons, the Examples serve to illustrate some of the advantages of the present invention.

Example 1

A 5-L stainless steel autoclave equipped with a mechanical stirrer and conditioned under inert atmosphere after vacuum drying at 85° C. was charged with 500 g of polyethylene pellets. The bed of polymer pellets was maintained under efficient stirring in order to simulate the dispersion of a fluidised bed.

The reactor was cooled down to 50° C., and 7.0 g of the prepolymer prepared above were then introduced in the reactor. The reactor was heated at 88° C., and nitrogen under a partial pressure of 1.4 MPa and hydrogen under a partial pressure of 0.4 MPa were introduced. The polymerisation was started by the rapid introduction (20 seconds) of ethylene under a partial pressure of 0.6 MPa. Ethylene was continuously and automatically metered via mass flowmeter so as to keep constant the monomer partial pressure. After 20 minutes polymerisation run and stabilisation of pressure and temperature, 105 μmol of diethylaluminium chloride (DEAC) as a solution in hexane (concentration: 15 mmol/L) were flushed in the reactor. 100 minutes after DEAC introduction, the polymerisation was stopped by rapid venting and the autoclave cooled down to room temperature. The resulting polyethylene was recovered as a free flowing polymer after separation from the pellets by sieving.

The results of the analysis performed on the polymer, and of the subsequent comparative examples described below are summarised in Table 1.

The SEM picture of polymer flake form this Example is illustrated in FIG. 1.

Example 2

A polymerisation was carried out under polymerisation conditions of example 1 but no DEAC was added during the polymerisation.

The SEM picture of the resulting polymer flake is illustrated in FIG. 2.

Example 3

A polymerisation was carried out under polymerisation conditions of example 1 but 105 μmol of dimethylaluminium chloride (DMAC) as a hexane solution (concentration: 15 mmol/L) were added in place of DEAC.

Example 4

A polymerisation was carried out under polymerisation conditions of example 1 but 105 μmol of triethylaluminium (TEA) as a hexane solution (concentration: 15 mmol/L) were added in place of DEAC.

The SEM picture of the resulting polymer flake is illustrated in FIG. 3.

Example 5

A polymerisation was carried out under polymerisation conditions of example 1 but 105 μmol of tri-iso-butylaluminium (TIBA) as a hexane solution (concentration: 15 mmol/L) were added in place of DEAC.

Example 6

A 5-L stainless steel autoclave equipped with a mechanical stirrer and conditioned under inert atmosphere after vacuum drying at 85° C. was charged with 500 g of polyethylene pellets. The bed of polymer pellets was maintained under efficient stirring in order to simulate the dispersion of a fluidised bed.

The reactor was cooled down to 50° C., and 105 μmol of diethylaluminium chloride (DEAC) were added as a hexane solution (concentration: 15 mmol/L). 7.0 g of the prepolymer prepared in B were then introduced in the reactor. The reactor was heated at 88° C., and nitrogen under a partial pressure of 1.4 MPa and hydrogen under a partial pressure of 0.4 MPa were introduced. 10 minutes after introduction of the prepolymer, the polymerisation was started by the rapid introduction (20 seconds) of ethylene under a partial pressure of 0.6 MPa. Ethylene was continuously and automatically metered via mass flowmeter so as to keep constant the monomer partial pressure. After 120 minutes, the polymerisation was stopped by rapid venting and the autoclave cooled down to room temperature. The resulting polyethylene was recovered as a free flowing polymer after separation from the pellets by sieving.

The results of the analysis performed on the polymer are summarised in Table 1.

Example 7

A polymerisation was carried out under polymerisation conditions of example 6 but 105 µmol of dimethylaluminium chloride (DMAC) as a hexane solution (concentration: 15 mmol/L) were added in place of DEAC.

Example 8

A polymerisation was carried out under polymerisation conditions of example 6 but 105 µmol of triethylaluminium (TEA) as a hexane solution (concentration: 15 mmol/L) were added in place of DEAC.

Example 9

A polymerisation was carried out under polymerisation conditions of example 6 but 105 µmol of tri-iso-butylaluminium (TIBA) as a hexane solution (concentration: 15 mmol/L) were added in place of DEAC.

that the absence of precontact leads to better result in term of yield, productivity and number of agglomerates formed during the polymerisation.

BRIEF DESCRIPTION OF THE DRAWINGS

The invention is further described with reference to the accompanying drawings, in which.

Examples 10 to 19

Figure 1:
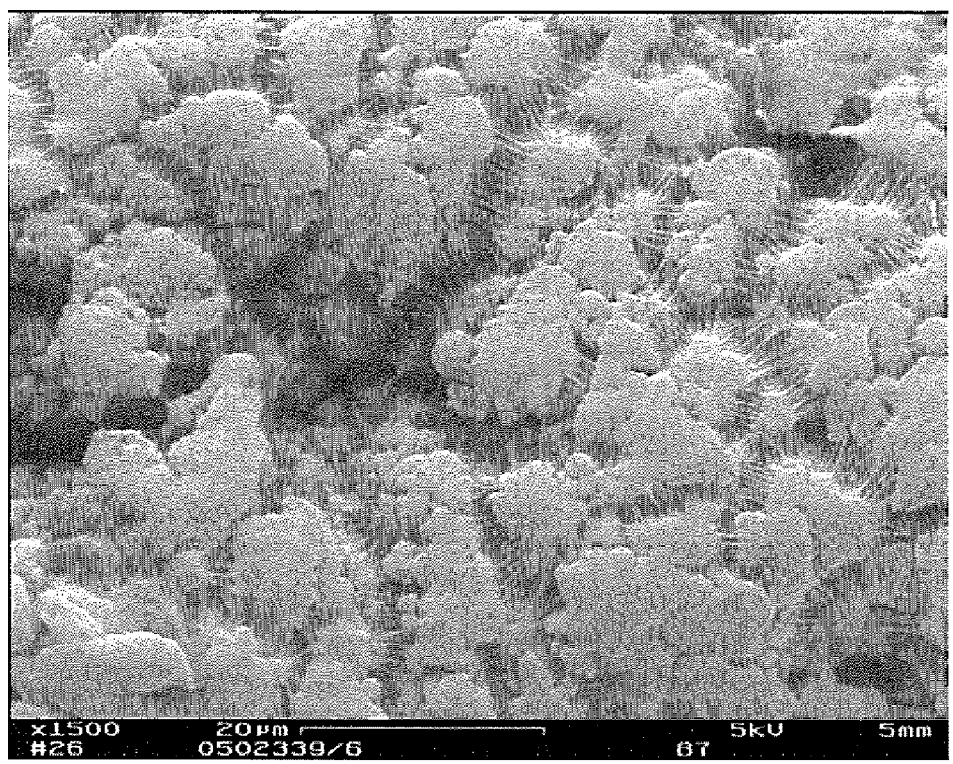
FIGS. 1 to 3 show the different particle morphologies obtained from Examples 1, 2 and 4. Comparison of FIGS. 1 and 3 shows that the reaction involving DEAC is "softer" (less exothermic reaction) than use of TEA. In particular, the flakes formed in the presence of TEA have a smoother surface indicative of higher temperatures/melting. This can also be tentatively correlated to the risk of forming agglomerates. In contrast, comparison of FIGS. 1 and 2 show that the reaction involving DEAC results in a morphology of the grains of polymer much more similar to that formed in absence of a second activator compound.
Figure 2:
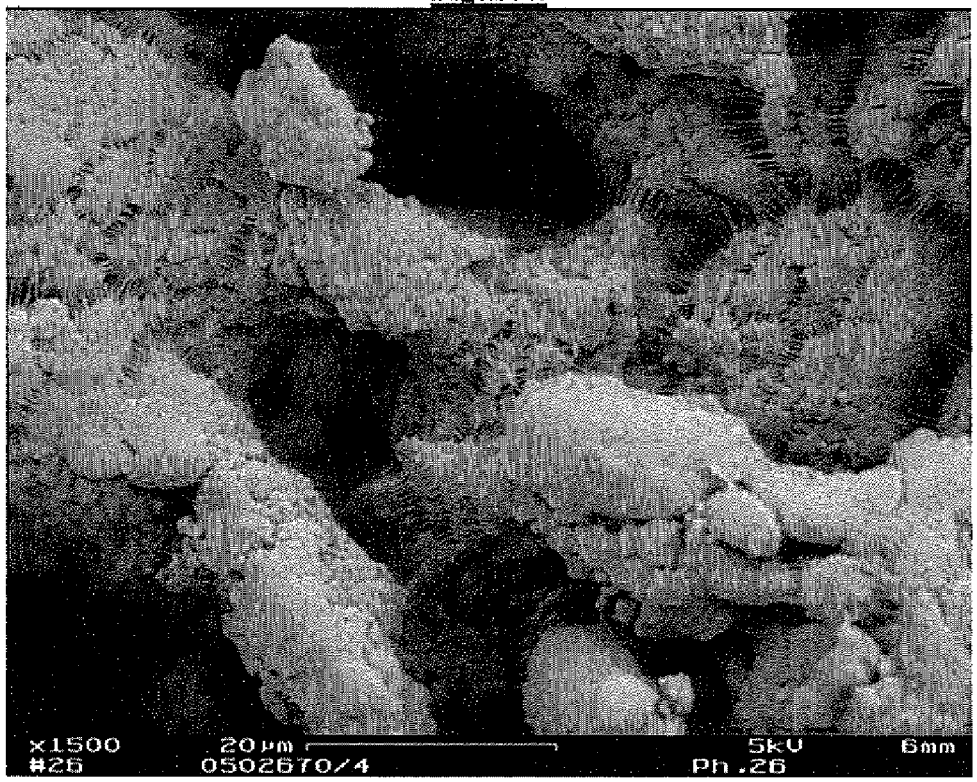
Figure 3:
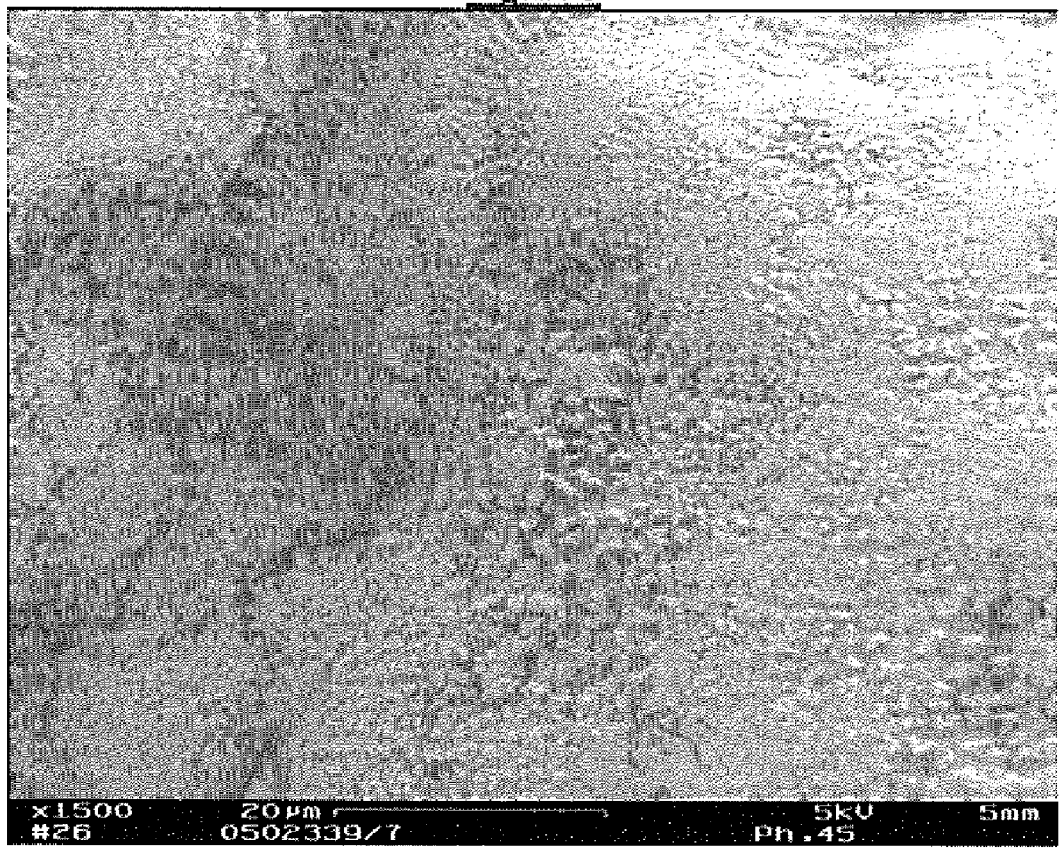

The gas phase polymerisation of ethylene with 1-hexene was carried out in fluidised-bed reactor. The reactor is as shown diagrammatically in FIG. 2 of EP 0855411, and comprises a cylindrical section fitted with a fluidisation grid at the base and having a diameter of 5 m. A bed height of 16 m was used for Examples 10 to 19.

For each of Examples 10 to 19, a reaction gas mixture comprising ethylene, 1-hexene, hydrogen and nitrogen was

TABLE 1

| Example | Secondary Cocatalyst | Precontact with catalyst | Polymer Yield (g) | Productivity (KgPE/mmol$_{Ti}$) | MI2.16 (dg/min) | Agglomerates |
|---|---|---|---|---|---|---|
| 1 | DEAC | No | 412 | 2.35 | 5.1 | None |
| 2 | None | — | 218 | 1.25 | 3.3 | None |
| 3 | DMAC | No | 360 | 2.06 | 3.6 | None |
| 4 | TEA | No | 345 | 1.97 | 3.4 | Low |
| 5 | TIBA | No | 286 | 1.63 | 4.4 | Low |
| 6 | DEAC | Yes | 223 | 1.27 | 3.1 | Low |
| 7 | DMAC | Yes | 161 | 0.92 | 2.9 | Low |
| 8 | TEA | Yes | 196 | 1.12 | 3.7 | High |
| 9 | TIBA | Yes | 195 | 1.11 | 5.7 | High |

Comparison of Example 1 with Example 2 demonstrates the advantages of the addition of DEAC into the reactor without precontact with the catalyst and in addition to the sole use of a trialkylaluminium as activator (in this case tri-n-octylaluminium added to the prepolymer). In particular, the yield, productivity and melt index obtained are all increased (the higher melt index indicates a better "hydrogen response").

Comparison of Example 1 with Example 3 demonstrates that DEAC also provides a higher yield, productivity and better H2 response than using DMAC. As described already, the lower volatility of DEAC compared to DMAC also allows for easier handling and reduced corrosion risk Comparison of Example 1 with Examples 4 and 5 again show higher polymer yield, productivity and hydrogen response with lower agglomerates, this time using DEAC compared to a further trialkylaluminium compound.

Examples 6 to 9 present results obtained when the second activator compound is precontacted with the catalyst prior to the reactor. Comparison of Example 1 with Example 6 shows passed through the fluidised bed at an absolute pressure of 2 Mpa, an upward speed of 0.6 m/s, and at a temperature as shown in Table 2.

The catalyst added to the polymerisation reactor for each example was in prepolymer form as prepared in example B.

Diethylaluminium chloride was introduced into the reactor as a diluted solution in n-pentane (DEAC concentration at 4% by weight). DEAC is injected in via one or several liquid injection nozzles, without any precontact step with the catalyst.

The reactor output rate was progressively increased for each condition and the formation of agglomerates, the level of static and the presence of hot spots were monitored all along with the production.

For each example, the general polymerisation parameters under steady state conditions are summarised in Table 2. No signs of reactor fouling were observed under these conditions.

TABLE 2

| | Example | | | | | | | | | |
|---|---|---|---|---|---|---|---|---|---|---|
| | Comp. 10 | 11 | 12 | 13 | 14 | Comp. 15 | 16 | 17 | Comp. 18 | 19 |
| Polymerisation temperature (° C.) | 102 | 102 | 102 | 101 | 101 | 105 | 105 | 105 | 109 | 109 |
| DEAC flow rate (g/h) | 0 | 37 | 45 | 58 | 53 | 0 | 40 | 52 | 0 | 71 |
| DEAC/Ti flow ratio (mol/mol) | 0 | 0.05 | 0.06 | 0.10 | 0.08 | 0.00 | 0.05 | 0.06 | 0.00 | 0.09 |
| pC2 (bars) | 6.1 | 6.1 | 5.4 | 5.3 | 5.5 | 7.3 | 6.6 | 6.3 | 7.4 | 6.4 |
| H2/C2 ratio (mol/mol) | 0.30 | 0.26 | 0.22 | 0.18 | 0.14 | 0.40 | 0.31 | 0.22 | 0.35 | 0.25 |
| Hexene/C2 ratio (mol/mol) | 0.26 | 0.26 | 0.24 | 0.22 | 0.24 | 0.10 | 0.10 | 0.10 | 0.02 | 0.02 |
| Average residence time (h) | 4.1 | 3.5 | 3.3 | 3.3 | 2.8 | 3.4 | 3.3 | 2.9 | 4.0 | 3.3 |
| Production rate (T/h) | 20.1 | 23.5 | 24.7 | 25 | 29.6 | 27.7 | 28.8 | 33.0 | 25.0 | 30.0 |
| Chlorine from DEAC/total polymer ratio (mg/kg) | 0 | 0.47 | 0.53 | 0.68 | 0.52 | 0 | 0.40 | 0.46 | 0 | 0.70 |
| Polymer MI2.16 (dg/min) | 4.5 ± 0.5 | 4.5 ± 0.5 | 4.5 ± 0.5 | 4.5 ± 0.5 | 4.5 ± 0.5 | 11.0 ± 1 | 11.0 ± 1 | 11.0 ± 1 | 8.0 ± 1.0 | 8.0 ± 1.0 |
| Polymer density (kg/m3) | 938 ± 1 | 938 ± 1 | 938 ± 1 | 938 ± 1 | 938 ± 1 | 952 ± 1 | 952 ± 1 | 952 ± 1 | 960 ± 1 | 960 ± 1 |
| Ti content in polymer (mg/kg PE) | 14.6 | 12.4 | 11.5 | 9.7 | 9.2 | 12.3 | 10.1 | 10.4 | 11.5 | 10.2 |

The results exemplify the process of the present invention for three different products covering a broad range of density (938 up to 960 kg/m³). In all cases the DEAC introduction rates corresponds to 0.4 to 0.7 ppm by weight of chlorine relative to the total polyethylene produced.

The results for each grade are consistent and show for each particular grade the advantages of addition of DEAC into the reactor without precontact with the catalyst compared to the sole use of a trialkylaluminium as activator (in this case tri-n-octylaluminium added to the prepolymer), even at the low levels of the present invention. In particular, for each grade:

(1) hydrogen demand is markedly reduced as DEAC/Ti ratio increases (shown by the fact that lower H2/C2 ratio are required to get the same MI, and equivalent to the "higher hydrogen response" shown by the previous examples), (2) the catalyst productivity is improved when DEAC increases. This is shown by the lower titanium residues in the polymer, and is in spite of the lower ethylene partial pressure and shorter residence time generally used, meaning that the catalyst activity is also increased to a large extent, (3) higher reactor output rates can be achieved with DEAC without the appearance of hot spots or agglomeratees in the reactor.

The invention claimed is:

1. A continuous process for the polymerisation of ethylene in a polymerisation reactor, wherein the process comprises using a catalyst system comprising:
   i) a solid catalyst comprising Ti, Mg and halogen,
   ii) a first activator which is at least one trialkylaluminium compound of the formula $AlR_3$, where each R is independently a C2 to C20 alkyl radical, and
   iii) a second activator which is at least one alkylaluminium chloride of the formula $AlR'_2Cl$, where each R' is independently a C2 to C20 alkyl radical,
   wherein the second activator is introduced directly into the polymerisation reactor, without precontact with the solid catalyst, continuously or semi-continuously, and at a maximum rate of introduction at any time corresponding to less than 10 ppm by weight of chlorine relative to the rate of polyethylene production.

2. A process as claimed in claim 1 wherein the second activator is provided at a ratio relative to the first activator of less than 0.2 mole/mole.

3. A process as claimed in claim 1 wherein the second activator is introduced at a maximum rate at any time corresponding to less than 5 ppm by weight of chlorine relative to polyethylene produced.

4. A process as claimed in claim 3 wherein the second activator is introduced at a maximum rate at any time corresponding to less than 2 ppm by weight of chlorine relative to polyethylene produced.

5. A process as claimed in claim 1 wherein the at least one trialkylaluminium compound of the formula $AlR_3$ is selected from triethylaluminium (TEA), tripropylaluminium, tri(isobutyl) aluminium (TiBA), tri(n-butyl) aluminium (TnBA), tri(n-hexyl)aluminium (TnHA) and tri(n-octyl)aluminium (TnOA).

6. A process as claimed in claim 1 wherein the first activator is pre-contacted with the solid catalyst prior to being introduced into the reactor.

7. A process as claimed in claim 6 wherein the first activator is contacted with the solid catalyst and ethylene to form a prepolymer, which is subsequently introduced into the reactor.

8. A process as claimed in claim 1 wherein the at least one alkylaluminium chloride of the formula $AlR'_2Cl$, is selected from diethylaluminium chloride (DEAC), dipropylaluminium chloride (DnPrAC), di(isobutyl)aluminium chloride (DiBAC) and di(n-butyl)aluminium chloride (DnBAC).

9. A process as claimed in claim 8 wherein the at least one alkylaluminium chloride of the formula $AlR'_2Cl$ is DEAC.

10. A method for improving the whiteness index of a polyethylene obtained by the continuous polymerisation of ethylene in a polymerisation reactor, wherein the polymerisation process comprises using a catalyst system comprising:

i) a solid catalyst comprising Ti, Mg and halogen, and
ii) a first activator which is at least one trialkylaluminium compound of the formula $AlR_3$, where each R is independently a C2 to C20 alkyl radical,
wherein a second activator which is at least one alkylaluminium chloride of the formula $AlR'_2Cl$, where each R' is independently a C2 to C20 alkyl radical is introduced directly in the polymerisation reactor, without precontact with the solid catalyst, continuously or semi-continuously, and at a maximum rate of introduction at any time corresponding to less than 10 ppm by weight of chlorine relative to the rate of polyethylene production.

* * * * *